United States Patent [19]

Hashimoto et al.

[11] Patent Number: 5,079,085
[45] Date of Patent: Jan. 7, 1992

[54] MAGNETIC RECORDING MEDIUM CONTAINING A BINDER WHICH IS CHEMICALLY BONDED TO CROSSLINKED RESIN FINE PARTICLES CONTAINED IN THE MAGNETIC LAYER

[75] Inventors: Hiroshi Hashimoto; Tsutomu Okita, both of Kanagawa, Japan

[73] Assignee: Fuji Photo Film Co., Ltd., Kanagawa, Japan

[21] Appl. No.: 417,334

[22] Filed: Oct. 5, 1989

[30] Foreign Application Priority Data

Oct. 5, 1988 [JP] Japan .................................. 63-249987

[51] Int. Cl.$^5$ .............................................. G11B 23/00
[52] U.S. Cl. ...................................... 428/327; 428/403; 428/407; 428/694; 428/900
[58] Field of Search ............... 428/407, 403, 900, 694, 428/327

[56] References Cited

U.S. PATENT DOCUMENTS

| | | | |
|---|---|---|---|
| 4,656,089 | 4/1987 | Ninomiya et al. | 428/327 |
| 4,710,424 | 12/1987 | Bandaira et al. | 428/325 |
| 4,743,653 | 5/1988 | Numata et al. | 525/125 |
| 4,842,936 | 6/1989 | Kashihara et al. | 428/407 |

Primary Examiner—Merrell C. Cashion, Jr.
Assistant Examiner—Stevan A. Resan
Attorney, Agent, or Firm—Sughrue, Mion, Zinn Macpeak & Seas

[57] ABSTRACT

A magnetic recording medium comprising a nonmagnetic support having provided thereon a magnetic layer comprising ferromagnetic fine powder dispersed in a binder, wherein said magnetic layer contains crosslinked resin fine particles to which a polymer containing an —OH group has been bonded, and an isocyanate compound, said polymer containing an —OH group having an affinity toward said binder and said —OH group reacting with said isocyanate compound to form a chemical bond with said binder.

17 Claims, No Drawings

MAGNETIC RECORDING MEDIUM CONTAINING A BINDER WHICH IS CHEMICALLY BONDED TO CROSSLINKED RESIN FINE PARTICLES CONTAINED IN THE MAGNETIC LAYER

FIELD OF THE INVENTION

This invention relates to a magnetic recording medium for use as a video tape, an audio tape, a computer tape, a floppy disk or the like.

BACKGROUND OF THE INVENTION

With the recent demand for higher-density recording, magnetic recording media are required to have smaller ferromagnetic particle sizes, well dispersed ferromagnetic particles, improved surface smoothness of magnetic layers, and higher loadings of ferromagnetic particles.

Magnetic recording media which meet the above requirements and have excellent electromagnetic characteristics and which therefore can record information at high densities are further required to have good running durability. In general, however, a magnetic recording medium with a magnetic layer having extremely good surface smoothness shows very poor running properties or running durability, because such a smooth surface results in an extremely high coefficient of friction between the magnetic layer and, for example, the guide pole or head in a video tape recorder (VTR).

For improving poor running properties and durability, an abrasive material or a lubricating agent is generally incorporated in magnetic layers. However, in order to obtain good running durability by means of an abrasive material, the amount of the abrasive material incorporated should be fairly high, resulting in a decrease in the loading of ferromagnetic particles and, hence, poor electromagnetic characteristics of the magnetic recording medium. In the case where a lubricating agent is incorporated in a magnetic layer for improving the running durability, a binder is disadvantageously plasticized by the lubricating agent, and this results in a decrease in the mechanical strength of the magnetic layer, leading to poor durability of the magnetic recording medium.

In an attempt to overcome these problems, a method is employed in which the hardness of a magnetic layer is increased using a binder having a high glass transition temperature or a binder having good hardening properties as disclosed in, for example, JP-A-60-235814. (The term "JP-A" as used herein means an "unexamined published Japanese patent application"). However, a recording medium with such a magnetic layer has a problem that because of the brittleness of the magnetic layer, dropouts are caused and its still durability is deteriorated.

JP-A-61-90327 discloses, as another means, a method in which spherical fine particles of a polymer are incorporated in a magnetic layer. This method is advantageous in that since polymer particles are superior to inorganic powders in affinity for binders, the dispersibility of the polymer particles is better than that of inorganic powders and the incorporation of the polymer particles is considerably effective in improving the mechanical strength of magnetic layers.

However, in the case of tapes which are for use in, for example, S-VHS VTR's or 8 mm VTR's and required to have extremely good surface smoothness and excellent electromagnetic characteristics, not only the mechanical strength of the magnetic layer as a whole but also the mechanical strength of the extreme surface of the magnetic layer should be improved. In this sense, the method disclosed in JP-A-61-90327 described above is disadvantageous. That is, since no chemical bond is formed between the polymer fine particles and the binder, the extreme surface of the magnetic layer is damaged and peels off due to the friction between the magnetic layer running at a high speed and a VTR head. Accordingly, the durability problem has not yet been overcome completely.

SUMMARY OF THE INVENTION

Under these circumstances, intensive studies have been made to develop a magnetic recording medium which is excellent in both electromagnetic characteristics and running durability. These studies have been made on magnetic recording media for high-density recording, which employ ferromagnetic particles having extremely small particle sizes, such as S-VHS video tapes, high band 8 mm video tapes and high-density floppy disks.

As a result of the intensive studies, the present inventors have found that extremely good electromagnetic characteristics and running durability can be obtained by incorporating, in a magnetic layer, crosslinked resin fine particles to which an —OH group-containing polymer has been bonded and an isocyanate compound.

Accordingly, an object of the present invention is to provide a magnetic recording medium having excellent electromagnetic characteristics and running durability.

The magnetic recording medium according to the present invention comprises a non-magnetic support having provided. thereon a magnetic layer comprising a ferromagnetic fine powder dispersed in a binder, wherein the magnetic layer contains crosslinked resin fine particles to which a polymer containing an —OH group has been bonded, and an isocyanate compound, the polymer containing an —OH group having an affinity toward the binder and the —OH group reacting with the isocyanate compound to form a chemical bond with the binder.

DETAILED DESCRIPTION OF THE INVENTION

The crosslinked resin fine particles to which an —OH group-containing polymer has been bonded, which can be used in the magnetic recording medium of this invention, are particles of a polymer having a three-dimensional crosslinked structure and a straight-chain polymer containing an —OH group, the straight-chain polymer being chemically bonded to the surfaces of the particles of the crosslinked polymer through graft polymerization or other means.

The crosslinked resin fine particles used in the invention are so good in solvent resistance that they never dissolve away in a magnetic coating fluid and, hence, can maintain their shape even after the magnetic coating fluid is applied on a support to form a magnetic layer. Therefore, the resin particles can improve the mechanical strength of the whole magnetic layer by means of a filler effect. Further, the —OH group-containing polymer bonded to the crosslinked resin fine particles has a good affinity for a selected binder, so that the polymer never adversely affects the dispersibility of magnetic particles. Furthermore, since the —OH groups contained in this polymer react with an isocyanate compound to form chemical bonds with a selected binder, the resulting magnetic layer is extremely tough. That is, the —OH group reacts with an isocyanate group (-NCO) to form a urethane bond

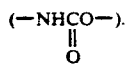

Hence, even the crosslinked resin fine particles present on the extreme surface of the magnetic layer which is subjected to a substantial frictional force caused by the friction between the extreme surface and a VTR head do not suffer damage or fall off.

The crosslinked resin fine particles used in the present invention are polymer particles having a three-dimensional crosslinked structure. For example, such polymer particles comprises a polymerized resin such as an acrylic resin or a vinyl resin or a condensation resin such as a polyester resin, an epoxy resin or an amino resin, as disclosed in, for example, JP-A-60-255827, JP-A-62-246916 and JP-A-62-246917. The particle diameters thereof are preferably 15 in the range of from 0.01 to 0.3 μm, more preferably from 0.02 to 0.1 μm.

Particle diameters exceeding 0.3 μm are disadvantageous in that the resulting magnetic layer is not good in surface smoothness, resulting in poor electromagnetic characteristics. However, an appropriate surface roughness which is small enough not to adversely affect the electromagnetic characteristics is advantageous because it serves to decrease the friction coefficient of the magnetic layer and improves its running durability. 25 The —OH group-containing polymer bonded to the crosslinked resin fine particles is preferably an acrylic resin or a vinyl resin, and preferably formed by addition-polymerizing an addition-polymerizable monomer (for example, an acrylic monomer) to addition-polymerizable unsaturated groups present on the surfaces or inner part of the crosslinked resin fine particles. Alternatively, the —OH group-containing polymer such as a polyester resin, a polyurethane resin, an epoxy resin or an amino resin, may be directly bonded to functional groups present on or in the crosslinked resin fine particles by an esterification, an ester exchange reaction interchange or a urethane-forming reaction.

The —OH group-containing polymer bonded to the crosslinked resin fine particles should have a good affinity for the binder in the magnetic layer. If the polymer lacks affinity for the binder, not only the dispersibility of ferromagnetic particles is impaired, but there is no effect of improving the mechanical strength of the resulting magnetic layer. For this reason, —OH groups are contained in the polymer in a proper amount as will be specified later. Another function of the —OH groups is to form chemical linkages with a binder, through the reaction with an isocyanate compound in combination with the crosslinked resin fine particles, thereby preventing the crosslinked resin fine particles from falling off the magnetic layer even when a substantial frictional force is externally applied to the magnetic layer.

Therefore, by the incorporation of the crosslinked resin fine particles to which an —OH group-containing polymer has been bonded and an isocyanate compound in a magnetic layer, the running durability of the magnetic layer can be greatly improved, with its electromagnetic characteristics not being impaired.

Crosslinked resin fine particles preferably used in this invention can be obtained by subjecting a polyfunctional monomer having at least two different copolymerizable unsaturated groups, a monomer polymerizable with one of the unsaturated groups of the polyfunctional monomer, and a crosslinkable monomer to emulsion polymerization, thereby to form crosslinked resin fine particles, with the other unsaturated group in the polyfunctional monomer remaining unreacted, and then subjecting a monomer copolymerizable with the other unsaturated group in the polyfunctional monomer and an —OH group-containing monomer to graft polymerization.

Preferred polyfunctional monomer having at least two different copolymerizable unsaturated groups is a monomer having an unsaturated group such as an acryloyl group or a methacryloyl group, which unselectively reacts with a monomer to be copolymerized and also having an unsaturated group such as an allyl group, a maleic acid- type double bond or a double bond in an unsaturated fatty acid, which selectively reacts with a polymerizable aromatic compound. Specific examples of polyfunctional monomers which can be used in this invention include allyl (meth)acrylate, an adduct of allyl glycidyl ether with (meth)acrylic acid, an adduct of monoallylamine or diallylamine with glycidyl (meth)acrylate or an isocyanate having a (meth)acryloyl group, an adduct of allyl alcohol with an isocyanate having a (meth)acryloyl group, an adduct of maleic acid or fumaric acid with glycidyl (meth)acrylate, an adduct of a monoester of maleic acid or fumaric acid with glycidyl (meth)acrylate, and an adduct of a fatty acid having an unsaturated group with glycidyl (meth)acrylate.

Examples of the monomer polymerizable with an acryloyl or methacryloyl group in the above-described polyfunctional monomer are for example, an alkyl acrylate, an alkyl methacrylate, glycidyl (meth)acrylate, an α-olefin, a vinyl compound, a diene compound, a carboxyl group-containing 20 monomer, an —OH group-containing monomer, a nitrogen containing alkyl acrylate, a polymerizable amide or a polymerizable nitrile. Specific examples of such monomers include methyl (meth)acrylate, ethyl (meth)acrylate, n-butyl (meth)acrylate, 2-ethylhexyl (meth)acrylate, glycidyl (meth)acrylate, ethylene, propylene, vinyl acetate, vinyl propionate, butadiene, isoprene, acrylic acid, methacrylic acid, crotonic acid, itaconic acid, maleic acid, fumaric acid, 2-hydroxyethyl (meth)acrylate, hydroxypropyl (meth)acrylate, hydroxybutyl (meth)acrylate, (meth)allyl alcohol, dimethylaminoethyl (meth)acrylate, (meth)acrylic acid amide and (meth)acrylonitrile.

The crosslinking monomer used in the present invention is a compound having in the molecule at least two unsaturated groups which can undergo radical polymerization. Examples of such a compound include ethylene glycol di(meth)acrylate, 1,6-hexanediol di(meth)acrylate, an adduct of acrylic acid with glycidyl (meth)acrylate, an adduct of hydroxyethyl (meth)acrylate with an isocyanatoalkyl (meth)acrylate, and radical-polymerizable silane coupling agents such as vinyltrialkoxysilanes and (meth)acryloxy-acryltrialkoxysilanes.

In conducting emulsion polymerization, it is preferred to use an amphoteric polar group-containing dispersing agent as disclosed in JP-A-58-129066 and JP-A-60-255827 as an emulsifying agent.

To the crosslinked resin fine particles obtained by the above-described method, a polymerizable aromatic compound (for example, α-methylstyrene, styrene, vinyltoluene, t-butylstyrene) and an —OH group-containing monomer as described above and, if desired and necessary, a polyfunctional monomer as described above are graft-polymerized, thereby forming an —OH group-containing polymer bonded to the crosslinked resin fine particles.

The molecular weight of this graft polymer is preferably in the range of from 1,000 to 20,000. If the molecular weight exceeds this upper limit, dispersibility is impaired. If it is below the lower limit, the effect of improving mechanical properties is lowered. The proportion of the graft polymer to the crosslinked resin fine particles is preferably from 2/8 to 8/2 by weight. The content of —OH groups in the graft polymer is preferably from $20 \times 10^{-5}$ to $200 \times 10^{-5}$ equivalents per gram of the graft polymer. If the content is higher than this upper limit, the dispersibility is impaired, while a content below the lower limit causes the polymer to show poor curability, resulting in insufficient durability of the magnetic layer.

It is preferred that the crosslinked resin fine particles to which the polymer has been bonded be contained in the magnetic layer in an amount of 0.1 to 5 wt % based on the weight of the ferromagnetic fine powder. If the content thereof exceeds this upper limit, the electromagnetic properties of the resulting recording medium are impaired, while contents below the lower limit result in insufficient durability of the magnetic layer.

The isocyanate compound used in the present invention can be selected from the polyisocyanate compounds used conventionally as a curing agent component for polyurethane resins. Preferred are, for example, a reaction product of 3 mols of tolylene diisocyanate with 1 mol of trimethylolpropane, a reaction product of 3 mols of xylylene diisocyanate or hexamethylene diisocyanate with 1 mol of trimethylolpropane, a biuret addition compound formed from 3 mols of hexamethylene diisocyanate, an isocyanurate compound formed from 5 mols of tolylene diisocyanate, an isocyanurate addition compound formed from 3 mols of tolylene diisocyanate and 2 mols of hexamethylene diisocyanate, and a polymer of isophorone diisocyanate or diphenylmethane diisocyanate.

The amount of the isocyanate compound contained in the magnetic layer is preferably from 2 to 10 wt % based on the weight of the ferromagnetic fine particles.

The ferromagnetic fine powder used in this invention are, for example, fine particles of a metal oxide such as $\gamma$-$Fe_2O_3$, ferromagnetic metal fine particles containing Fe, Co, Ni, etc. or fine particles of a metal oxide containing a different kind of metal, such as Co-doped $\gamma$-$Fe_2O_3$. The shape of the ferromagnetic fine particles is not particularly limited, but normally include articular or particulate. Especially preferred examples thereof are ferromagnetic alloy fine particles having a BET specific surface area of 30 m$^2$/g or more and a pH of from 7 to 10. The ferromagnetic fine powder preferably has a crystallite size of 250 Å or less, with a preferred size being 150 Å or less.

A binder which constitutes part of the magnetic layer can be selected from the conventional binders. Examples of the binder are a vinyl chloride-vinyl acetate copolymer, a copolymer of vinyl chloride, vinyl acetate, vinyl alcohol, maleic acid and/or acrylic acid, a vinyl chloride-vinylidene chloride copolymer, a vinyl chloride-acrylonitrile copolymer, an ethylene-vinyl acetate copolymer, cellulose derivatives such as a nitrocellulose resin, an acrylic resin, a polyvinyl acetal resin, a polyvinyl butyral resin, an epoxy resin, a phenoxy resin, a polyurethane resin, and a polycarbonate polyurethane resin. For further improving the dispersibility of the ferromagnetic fine particles and the durability of the resulting magnetic recording medium, it is preferred for the above-described binders to have in their molecules a polar group (epoxy, —$CO_2H$, —OH, —$NH_2$, —$SO_3M$, —$OSO_3M$, —$PO_3M_2$, —$OPO_3M_2$; wherein M represents hydrogen, an alkali metal or ammonium, provided that where one group contains plural M's, they may be the same or different). The content of such a polar group in the binder polymer is preferably in the range of from $1 \times 10^{-7}$ to $1 \times 10^{-3}$ equivalents, more preferably from $1 \times 10^{-6}$ to $5 \times 10^{-4}$ equivalents, per gram of the polymer.

The above-described polymers may be used alone or in combination of two or more thereof, as the binder. The binder is combined with the above-described isocyanate compound for curing.

In the magnetic recording medium of the present invention, the total amount of the binder contained in the magnetic layer is generally from 10 to 100 parts by weight, preferably from 20 to 40 parts by weight, per 100 parts by weight of the ferromagnetic fine powder.

It is preferred that the magnetic layer in the magnetic recording medium of this invention further contains inorganic particles having a Mohs' hardness of 5 or more.

Inorganic particles used in this invention are not particularly limited if they have a Mohs' hardness of 5 or more. Examples of the inorganic particles having a Mohs' hardness of 5 or more include $Al_2O_3$ (Mohs' hardness 9), TiO (Mohs' hardness 6), $TiO_2$ hardness 6.5), $SiO_2$ (Mohs' hardness 7), $SnO_2$ (Mohs' hardness 6.5), $Cr_2O_3$ (Mohs' hardness 9), and $\alpha$-$Fe_2O_3$ (Mohs' hardness 5.5). These can be used alone or in combination.

Especially preferred are inorganic particles having a Mohs' hardness of 8 or more. If relatively soft inorganic particles having a Mohs' hardness below 5 are used, not only do the inorganic particles tend to fall from the resulting magnetic layer, but also head clogging tends to occur and the running durability becomes poor, because the thus-obtained magnetic layer has almost no head-abrading effect.

The content of the inorganic particles in the magnetic layer is generally in the range of from 0.1 to 20 parts by weight, preferably from 1 to 10 parts by weight, per 100 parts by weight of the ferromagnetic fine powder.

In addition to the above-described inorganic particles, carbon black (particularly carbon black having an average particle diameter of from 10 to 300 nm) is preferably incorporated in the magnetic layer.

A method for preparing the magnetic recording medium of this invention will be described below.

First, a magnetic coating composition is prepared by kneading ferromagnetic fine particles, a binder, and crosslinked resin fine particles to which an —OH group-containing polymer has been bonded, and if necessary, other fillers and additives, together with a solvent. The solvent can be a solvent conventionally used in preparing conventional magnetic coating compositions.

The method for kneading is not particularly limited, and the order of the introduction of the components can be suitably determined.

For preparing the magnetic coating composition, a conventional kneading machine can be used. For example, there may be employed a two-roll mill, a three-roll mill, a ball mill, a pebble mill, a stone mill, a sand grinder, a Szegvari attritor, a high-speed impeller dispersing machine, a high-speed stone mill, a high-speed impact mill, a disper, a kneader, a high-speed mixer, a homogenizer or an ultrasonic dispersing device.

Known additives such as a dispersing agent, an antistatic agent and a lubricating agent can also be used in preparing the magnetic coating composition.

Examples of the dispersing agent are conventional dispersing agents such as a metallic soap prepared from a fatty acid and an alkali metal (for example, lithium, sodium, potassium, barium), an ester of a fatty acid, a compound obtained from the ester by substituting part or all of the hydrogen atoms in the ester with fluorine atoms, an amide of a fatty acid, an aliphatic amine, a higher alcohol, a polyalkyleneoxido-alkyl ester of phosphoric acid, an alkyl ester of phosphoric acid, an alkyl ester of boric acid, sarcosinates, alkyl ether esters, a trialkyl polyolefin, an oxy quaternary ammonium salt, and lecithin.

In the case where a dispersing agent is used, the amount thereof is generally in the range of from 0.1 to 10 parts by weight per 100 parts by weight of the ferromagnetic fine powder used.

Examples of the antistatic agent are electrically conductive fine particles such as carbon black or carbon black graft polymer particles; natural surface active agents such as saponin; nonionic surface active agents; cationic surface active agents such as higher alkyl amines, quaternary ammonium salts, salts of heterocyclic compounds (e.g., pyridine), and phosphonium or sulfonium compounds; anionic surface active agents containing an acid group such as a carboxylic acid, phosphoric acid or phosphate group; and amphoteric surface active agents such as amino acids, aminosulfonic acids, and esters of sulfuric or phosphoric acid with an amino-alcohol. In the case where the above-described electrically conductive fine particles are used as an antistatic agent, the amount thereof is, for example, in the range of from 0.1 to 10 parts by weight per 100 parts by weight of the ferromagnetic fine powder. Where a surface active agent is used, the amount thereof is from 0.12 to 10 parts by weight per 100 parts by weight of the ferromagnetic fine powder.

Examples of the lubricating agent include conventional lubricating agents such as an ester of a monobasic fatty acid having 12 to 20 carbon atoms with a mono-or polyhydric alcohol having 3 to 20 carbon atoms (e.g., sorbitan oleate), a mineral oil, a plant or animal oil, a low-molecular-weight olefin polymer, a silicone oil, a modified silicone oil, a graphite fine powder, a molybendenum deisulfide fine powder, and a tetrafluoroethylene polymer fine powder, and further include lubricating agents for plastics.

It should be noted that each of the above-described dispersing agents, antistatic agents and lubricating agents and other additives are not always required to have just one function, but they each may act also as a lubricating agent or an antistatic agent. Therefore, effects brought about by or expected from the respective additives are, of course, not limited to the effects implied by the names of these additives. Further, in the case where an additive having plural functions is used, it is preferred that the amount of the additive used be determined, taking all these functions into consideration.

The isocyanate compound is preferably incorporated into the magnetic coating composition after it has been prepared.

The thus-prepared magnetic coating composition is coated on a non-magnetic support.

The non-magnetic support which can be used in the present invention is conventional films of, for example, polyesters such as polyethylene terephthalate or polyethylene naphthalate, polyolefins, cellulose triacetate, polycarbonate, polyamide, polyamide-imide and polysulfon. The support may be subjected to corona discharge treatment, plasma treatment, undercoat treatment, heat treatment, and dust and contaminants removal treatment. To attain the object of the present invention, it is necessary to use as the non-magnetic support, a film having a center lime average surface roughness (Ra) of 0.03 $\mu$m or less, preferably 0.02 $\mu$m or less and more preferably 0.01 $\mu$m or less. The cut-off valve thereof is 0.25 mm. Further, it is preferred that the non-magnetic support not only has a small center line average surface roughness, but also does not has coarse projections of 1 $\mu$m or more. The surface roughness can be freely controlled by a size and amount of fillers added to the support, if desired and necessary. Examples of the fillers added are oxide or carbonate of Ca, Si, Ti and the like, and organic fine powder such as acrylic resin.

F-5 value is tape running direction (machine direction) of the non-magnetic support used in the present invention is preferably 5 to 50 kg/mm$^2$k, and F-5 value in the tape width direction is preferably 3 to 30 kg/mm$^2$. F-5 value in the tape running direction is generally higher than that in the tape width direction, but this is not essential if it is particularly required to increase the strength in the width direction.

The coefficient of heat shrinkage in the tape running and width directions of the non-magnetic support is preferably 3% or less and more preferably 1.5% or less at 100° C. for 30 minutes, and is preferably 1% or less and more preferably 0.5% or less at 80° C. for 30 minutes. The breaking strength of the support is preferably 5 to 100 kg/mm:, and the modulus of elasticity thereof is preferably 100 to 200 kg/mm$^2$, in both running and width directions.

The coating on the non-magnetic support is conducted directly or through an intermediate layer such as an adhesive layer.

A method for the coating on the non-magnetic support includes, for example, air doctor coating, blade coating, rod coating, extrusion coating, air knife coating, squeeze coating, impregnation coating, reverse roll coating, transfer roll coating, gravure coating, kiss coating, cast coating, spray coating and spin coating. Coating methods other than the above can also be used.

Further details of the above-described method for dispersing the ferromagnetic fine particles into the binder and method for coating the magnetic coating composition on a support are described in, for example, JP-A-54-46011 and JP-A-54-21805.

The thus-coated magnetic layer has generally a dry thickness of from about 0.5 to 10 $\mu$m, and preferably from 1.5 to 7.0 $\mu$m.

In the case where the magnetic recording medium produced is used in the form of a tape, the magnetic layer thus formed on the non-magnetic support is usually subjected to magnetic orientation to orientate the ferromagnetic particles contained therein, followed by drying. If desired and necessary, a surface-smoothing treatment is further applied thereto. The thus-treated magnetic recording medium is then cut into a desired shape.

The magnetic recording medium of the present invention has excellent electromagnetic characteristics as well as excellent running properties and durability. Hence, when used as a video tape, for example, the magnetic recording medium shows high reproduced outputs and, even under severe ambient conditions with a high temperature and a high humidity, it shows good running properties and durability. This is due to the fact that the crosslinked resin fine particles to which an —OH group-containing polymer has been bonded and the isocyanate compound, which are essential in this invention, have excellent effects of dispersing ferromagnetic fine powder and improving the mechanical properties of the magnetic layer. Furthermore, the present invention brings about an unexpected effect. That is, the adhesion of grime to calendar rolls can be greatly diminished, thereby greatly improving the rate of non-defective products.

The present invention will be explained in more detail by reference to the following Examples and Comparative Examples, but the Examples should not be construed to be limiting the scope of the invention. In the Examples and Comparative Examples, all parts are by weight unless otherwise indicated.

EXAMPLE 1

Magnetic coating compound (A) was prepared by kneading the ingredients shown below under "Magnetic Coating Composition (A)", by means of a ball mill for 48 hours to disperse the ingredients. Composition (B) shown below was then added thereto, and the resulting mixture was kneaded for 1 hour to give a dispersion. Thereafter, the dispersion was filtered through a filter having an average pore diameter of 1 $\mu$m, thereby preparing a magnetic coating composition. The thus-obtained magnetic coating composition was applied with a reverse roll on a 10 $\mu$m thick polyethylene terephthalate film support at a dry thickness of 4.0 $\mu$m with a reverse roll.

| Magnetic Coating Composition (A) | |
|---|---|
| Ferromagnetic alloy fine particles | 100 parts |
| Composition: 94% Fe, 4% Zn and 2% Ni | |
| Coercive force: 1500 Oe | |
| Crystallite size: 130Å | |
| Vinyl chloride copolymer | 12 parts |
| SO$_3$Na group content: 6 × 10$^{-5}$ eq/g | |
| OH group content: 20 × 10$^{-5}$ eq/g | |
| Glycidyl group content: 4 × 10$^{-5}$ eq/g | |
| vinyl chloride content: 86 wt % | |
| Degree of polymerization: 380 | |
| Polyester polyurethane | 8 parts |
| SO$_3$Na group content: 8 × 10$^{-5}$ eq/g | |
| OH group content: 10 × 10$^{-5}$ eq/g | |
| Average molecular weight: 60,000 | |
| Crosslinked resin fine particles | 2 parts |
| having bonded thereto OH group-containing polymer | |
| Fine particle portion: | |
| Methyl methacrylate/n-butyl methacrylate/ethylene glycol dimethacrylate copolymer | |
| Average particle size: 0.01 $\mu$m | |
| Polymer portion: | |
| Styrene/methyl methcrylate/hydroxyethyl methacrylate graft polymer | |
| OH group content: 20 × 10$^{-5}$ eq/g | |
| Fine particle portion/polymer portion | |
| weight ratio: 1/1 | |
| Abrasive material | 5 parts |
| ($\alpha$-alumina having an average particle diameter of 0.3 $\mu$m) | |
| Carbon black | 2 parts |
| (average particle diameter, 40 nm) | |
| Methyl ethyl ketone | 100 parts |
| Toluene | 150 parts |
| Composition (B) | |
| Stearic acid | 2 parts |
| Tridecyl stearate | 2 parts |
| Polyisocyanate | 5 parts |
| ("Coronate 3041" manufactured by Nippon Polyurethane Industry Co., Ltd., Japan) | |
| Methyl ethyl ketone | 50 parts |

The non-magnetic support on which the magnetic coating composition had been applied was subjected, before the composition was dried, to magnetic orientation y means of a magnet of 3,000 gauss. Subsequently, the resulting magnetic coating composition was dried, and the thus-obtained coated film was supercalendered and then cut into tapes of 8 mm in width, thereby preparing a 8 mm video tape (Tape Sample No. 1).

EXAMPLE 2

Tape Sample No. 2 was prepared in the same manner as in Example 1 except that the average particle diameter of the crosslinked resin fine particles was 0.06 $\mu$m and the amount of OH groups contained in the polymer bonded to the particles was $100 \times 10^{-5}$ eq/g.

EXAMPLE 3

Tape Sample No. 3 was prepared in the same manner as in Example 1 except that the average particle diameter of the 0 crosslinked resin fine particles was 0.10 $\mu$m, the amount of OH groups contained in the polymer bonded to the particles was $100 \times 10^{-5}$ eq/g and the —SO$_3$Na groups in the vinyl chloride resin were replaced by —OPO(OH)$_2$ groups.

EXAMPLE 4

Tape Sample No. 4 was prepared in the same manner as in Example 1 except that the average particle diameter of the crosslinked resin fine particles was 0.30 $\mu$m and the amount of OH groups contained in the polymer bonded to the particles was $200 \times 10^{-5}$ eq/g.

COMPARATIVE EXAMPLE 1

Tape Sample No. 5 was prepared in the same manner as in Example 1 except that the average particle diameter of the crosslinked resin fine particles was 0.6 $\mu$m and the amount of OH groups contained in the polymer bonded to the particles was 0, i.e., the polymer contained no hydroxyethyl methacrylate units.

COMPARATIVE EXAMPLE 2

Tape Sample No. 6 was prepared in the same manner as in Example 1 except that the crosslinked resin fine particles having a polymer bonded thereto were not used.

COMPARATIVE EXAMPLE 3

Tape Sample No.7 was prepared in the same manner as in Example 1 except that the isocyanate compound was not used.

Each of the thus-obtained tape samples was evaluated for the following properties by the following methods.

Calendar Grime

After the preparation of tapes, the tapes were supercalendered and the resulting grime was examined. That is, a supercalendering treatment was performed on 100m-long tape samples, and the resulting grime adhering to the metal roll on the side of the magnetic layer was visually examined and evaluated. The degree of the grime caused by the tape sample of Comparative Example 2 is shown by Δ, grime of a lighter degree or no grime is shown by o, and grime of a heavier degree is shown by x.

Reproduced Output at 7 MHz

Using a VTR (FUJIX-8 manufactured by Fuji Photo Film Co., Ltd., Japan), signals of 7 MHz were recorded on each of the tape samples and then reproduced Relative values of the outputs of the reproduced 7 MHz signals were determined, with the output from the tape sample of Comparative Example 2, which was regarded as a standard tape, being taken as 0 dB.

Friction Coefficient

A tape sample under a tension ($T_1$) of 50 g was brought into contact with a stainless-steel pole such that the tape sample was bent around the pole at an angle of 180°, and then the tape sample was run at a speed of 3.3 cm/sec. under these conditions and a tension ($T_2$) necessary for the running was measured. From the measured value, the friction coefficient $\mu$ of the tape sample was calculated using the following equation.

$$\mu = 1/\pi \ln(T_2/T_1)$$

The above test for friction coefficient was conducted in two different conditions, i.e., (a) at 20° C. under 70% RH, and (b) at 40° C. under 80% RH.

Clogging of Head

At an ambient temperature of 20° C. and a relative humidity of 10%, recording and reproduction were conducted using the above-described VTR. The clogging of the head in a 30 minute reproduction was evaluated as follows. The number of times when the output was decreased by 3 dB or more was counted, and samples which showed no such output decrease per 30 minute running are shown by o, those with 1 or 2 times of such output decrease are shown by Δ, and those with 3 or more are shown by x.

The results of the above evaluations are shown in Table 1.

apparent to one skilled in the art that various changes and modifications can be made therein without departing from the spirit and scope thereof.

What is claimed is:

1. A magnetic recording medium comprising a non-magnetic support having provided thereon a magnetic layer comprising ferromagnetic powder dispersed in a binder, wherein said magnetic layer contains cross-linked resin fine particles having a three-dimensional cross-linked resin fine particles having a three-dimensional cross-liked structure in an amount of 0.01 to 5.0 wt % based upon the amount of ferromagnetic powder to which resin particles a polymer containing an —OH group has been bonded, and an isocyanate compound, said binder being capable of reacting with said isocyanate, said polymer containing an —OH group having an affinity toward said binder and said —OH group reacting with said isocyanate compound to form a chemical bond with said binder, wherein said resin fine particles have a diameter in the range of from 0.01 to 0.3 μm, wherein the molecular weight of said —OH group-containing polymer as a graph copolymer is in the range of 1,000 to 20,000, and wherein the content of the —OH groups in the —OH group-containing polymer as a graft copolymer is from $20 \times 10^{-5}$ to $2000 \times 10^{-5}$ equivalents per gram of said graft copolymer, and wherein the ferromagnetic powder is selected from the group consisting of particles of a metal oxide, a ferromagnetic metal fine powder containing Fe, Co, or Ni or particles of a metal oxide containing a different kind of metal.

2. The magnetic recording medium of claim 1, wherein the resin fine particles have a three-dimensional crosslinked structure and a straight-chain polymer containing an —OH group is chemically bonded to surfaces of said particles.

3. The magnetic recording medium of claim 1, wherein the resin fine particles are polymer particles selected from the group consisting of a polymerized resin, a condensation resin, an epoxy resin or an amino resin.

4. The magnetic recording medium of claim 1, wherein the —OH group-containing polymer is an acrylic resin or a vinyl resin.

5. The magnetic recording medium of claim 1, wherein the —OH group-containing polymer is bonded to addition-polymerizable unsaturated groups present on surfaces or inner-arts of the fine particles.

6. The magnetic recording medium of claim 1, wherein the resin fine particles to which the —OH group-containing polymer has been bonded are obtained by emulsion copolymerization of a polyfunc-

TABLE 1

| | Sample No. | Polymer-bonded resin fine particles | | Isocyanate compound | Calender grime | Reproduced output at 7 MHz (dB) | Friction Coefficient | | Head clogging |
| | | Particle diameter (μm) | OH group content in polymer (eq/g) | | | | 20° C. 70% RH | 40° C. 80% RH | |
|---|---|---|---|---|---|---|---|---|---|
| Example 1 | 1 | 0.01 | $20 \times 10^{-5}$ | contained | o | +0.8 | 0.31 | 0.31 | o |
| Example 2 | 2 | 0.06 | $100 \times 10^{-5}$ | contained | o | +0.5 | 0.31 | 0.30 | o |
| Example 3 | 3 | 0.10 | $100 \times 10^{-5}$ | contained | o | +0.4 | 0.29 | 0.30 | o |
| Example 4 | 4 | 0.30 | $200 \times 10^{-5}$ | contained | o | +0.2 | 0.28 | 0.29 | o |
| Comparative Example 1 | 5 | 0.60 | 0 | contained | o | −0.3 | 0.28 | 0.43 | x |
| Comparative Example 2 | 6 | — | — | not contained | Δ | ±0.0 | 0.41 | 0.48 | x |
| Comparative Example 3 | 7 | 0.01 | $20 \times 10^{-5}$ | | o | −0.1 | 0.32 | 0.47 | x |

While the invention has been described in detail and with reference to specific examples thereof, it will be tional monomer having at least two different copolymerizable unsaturated groups, a monomer polymerizable with one of the unsaturated groups thereof, and a cross-linkable monomer under conditions so that one of the unsaturated groups of the polyfunctional monomer remains unreacted, and thereafter graft polymerizing a monomer copolymerizable with said other unsaturated group of the polyfunctional monomer and with an —OH group-containing monomer.

7. The magnetic recording medium of claim 1, wherein the proportion of the polymer containing an —OH group as a graft polymer to the crosslinked resin fine particles is 8. The magnetic recording medium of claim 1, wherein the crosslinked resin fine particles are contained in the magnetic layer in an amount of 0.1 to 5 weight % based on the weight of the ferromagnetic powder.

9. The magnetic recording medium of claim 1, wherein the isocyanate compound is contained in the magnetic layer from 2 to 10 weight % based on the weight of the ferromagnetic powder.

10. The magnetic recording medium of claim 1, wherein the ferromagnetic powder is ferromagnetic alloy particles having a BET specific surface area of 30 $m^2/g$ or more and a pH or 7 to 10.

11. The magnetic recording medium of claim 1, wherein the binder contains a polar group.

12. The magnetic recording medium of claim 11, wherein the polar group is present in the range of from $1 \times 10^{-7}$ to $1 \times 10^{-3}$.

13. The magnetic recording medium of claim 1, wherein the binder is present in an amount of from 10 to 100 parts by weight of the ferromagnetic powder.

14. The magnetic recording medium of claim 1, wherein the magnetic layer further contains inorganic particles having a Mohs' hardness of 5 or more in an amount of from 0.1 to 20 parts by weight of the ferromagnetic powder.

15. The magnetic recording medium of claim 1, wherein the magnetic layer additionally contains carbon black.

16. The magnetic recording medium of claim 1, wherein the —OH group-containing polymer is directly bonded to functional groups present on the cross-linked resin fine particles.

17. The magnetic recording medium of claim 1, wherein the —OH group-containing polymer is directly bonded to functional groups present in the cross-linked resin fine particles.

* * * * *